(12) United States Patent
Lowenthal et al.

(10) Patent No.: US 11,951,863 B2
(45) Date of Patent: *Apr. 9, 2024

(54) METHOD AND APPARATUS FOR MANAGEMENT OF CURRENT LOAD TO AN ELECTRIC VEHICLE CHARGING STATION IN A RESIDENCE

(71) Applicant: CHARGEPOINT, INC., Campbell, CA (US)

(72) Inventors: Richard Lowenthal, Cupertino, CA (US); David Baxter, Monte Sereno, CA (US); Harjinder Bhade, San Jose, CA (US)

(73) Assignee: CHARGEPOINT, INC., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/882,941

(22) Filed: Jan. 29, 2018

(65) Prior Publication Data

US 2018/0215276 A1 Aug. 2, 2018

Related U.S. Application Data

(63) Continuation of application No. 12/641,285, filed on Dec. 17, 2009, now Pat. No. 9,878,629.

(51) Int. Cl.
*B60L 53/63* (2019.01)
*B60L 53/10* (2019.01)
(Continued)

(52) U.S. Cl.
CPC .............. *B60L 53/63* (2019.02); *B60L 53/10* (2019.02); *B60L 53/11* (2019.02); *B60L 53/30* (2019.02);
(Continued)

(58) Field of Classification Search
CPC ...... B60L 11/1824; B60L 53/11; B60L 53/65; B60L 53/30; B60L 53/63; B60L 53/60;
(Continued)

(56) References Cited

U.S. PATENT DOCUMENTS 3,824,813 A 7/1974 Davis
5,307,001 A 4/1994 Heavey
(Continued)

FOREIGN PATENT DOCUMENTS

CN 104241720 A 12/2014
CN 104539030 A 4/2015
(Continued)

OTHER PUBLICATIONS

Advisory Action from U.S. Appl. No. 12/508,488, dated Nov. 30, 2010, 3 pages.
(Continued)

*Primary Examiner* — Richard Isla
*Assistant Examiner* — Manuel Hernandez
(74) *Attorney, Agent, or Firm* — NICHOLSON DE VOS WEBSTER & ELLIOTT LLP

(57) ABSTRACT

An electric vehicle charging station that is installed in a residence is coupled with a main circuit breaker in an electrical service panel. The charging station includes a charging point connection that couples an electric vehicle to a set of service drop power lines that provide electricity from a power grid to the residence; a current control device coupled to control the amount of electric current that can be drawn from the set of service drop power lines by an the electric vehicle through the charging point connection; a receiver to receive energy readings from one or more current monitors that indicate an amount of current is being drawn from the set of service drop power lines; and a set of control modules to cause the current control device to control the
(Continued)

amount of current that can be drawn by the electric vehicle through the charging point connection based on the received energy readings to avoid tripping the main circuit breaker.

19 Claims, 9 Drawing Sheets

(51) Int. Cl.
*B60L 53/30* (2019.01)
*B60L 53/60* (2019.01)
*H02J 3/14* (2006.01)
*H02J 7/00* (2006.01)
*H02J 7/04* (2006.01)

(52) U.S. Cl.
CPC .............. *B60L 53/305* (2019.02); *B60L 53/60* (2019.02); *H02J 3/14* (2013.01); *H02J 7/00712* (2020.01); *H02J 7/04* (2013.01); *Y02T 10/70* (2013.01); *Y02T 10/7072* (2013.01); *Y02T 90/14* (2013.01); *Y04S 30/12* (2013.01); *Y04S 30/14* (2013.01)

(58) Field of Classification Search
CPC ...... B60L 53/10; B60L 53/305; H02J 7/0027; H02J 3/14; H02J 7/04; H02J 7/00712; Y02T 10/7072; Y02T 10/7005; Y02T 90/121; Y02T 90/128; Y02T 90/169; Y02T 90/168; Y02T 90/14; Y04S 30/14; Y04S 30/12
USPC .......................................................... 320/109
See application file for complete search history.

(56) References Cited

U.S. PATENT DOCUMENTS

| | | | |
|---|---|---|---|
| 5,327,066 A | 7/1994 | Smith | |
| 5,550,465 A | 8/1996 | Yamamoto et al. | |
| 5,594,318 A | 1/1997 | Nor et al. | |
| 5,656,916 A | 8/1997 | Hotta | |
| 5,696,367 A | 12/1997 | Keith | |
| 5,814,972 A | 9/1998 | Shimada et al. | |
| 5,982,596 A | 11/1999 | Spencer et al. | |
| 6,067,008 A | 5/2000 | Smith | |
| 6,087,805 A | 7/2000 | Langston et al. | |
| 6,114,775 A | 9/2000 | Chung et al. | |
| 6,137,070 A | 10/2000 | Montague et al. | |
| 6,225,776 B1 | 5/2001 | Chai | |
| 6,614,204 B2 | 9/2003 | Pellegrino et al. | |
| 6,646,561 B1 | 11/2003 | Zur et al. | |
| 6,680,547 B1 | 1/2004 | Dailey | |
| 7,071,698 B2 | 7/2006 | Furukawa et al. | |
| 7,256,516 B2 | 8/2007 | Buchanan et al. | |
| 7,486,034 B2 | 2/2009 | Nakamura et al. | |
| 7,525,291 B1 * | 4/2009 | Ferguson ................ | H02J 7/045 |
| | | | 320/164 |
| 7,602,143 B2 | 10/2009 | Capizzo et al. | |
| 7,719,284 B2 | 5/2010 | Ohta et al. | |
| 7,746,049 B2 | 6/2010 | Sato | |
| 7,812,469 B2 | 10/2010 | Asada | |
| 7,834,613 B2 | 11/2010 | Ziegler et al. | |
| 7,876,071 B2 | 1/2011 | Chen et al. | |
| 8,013,570 B2 | 9/2011 | Baxter et al. | |
| 8,374,729 B2 | 2/2013 | Chapel et al. | |
| 8,410,755 B2 | 4/2013 | Chau | |
| 8,502,500 B2 | 8/2013 | Baxter et al. | |
| 8,731,130 B2 | 5/2014 | Reyes et al. | |
| 8,731,730 B2 | 5/2014 | Watkins et al. | |
| 8,766,595 B2 | 7/2014 | Gaul et al. | |
| 8,935,011 B2 | 1/2015 | Tischer | |
| 8,952,656 B2 | 2/2015 | Tse | |
| 9,061,597 B2 | 6/2015 | Oda et al. | |
| 9,168,841 B2 | 10/2015 | Kawai et al. | |
| 9,201,408 B2 | 12/2015 | Baxter et al. | |
| 9,290,104 B2 | 3/2016 | Gadh et al. | |
| 9,469,211 B2 | 10/2016 | Baxter et al. | |
| 9,493,087 B2 | 11/2016 | Leary | |
| 9,505,318 B2 | 11/2016 | Hendrix et al. | |
| 9,623,762 B2 | 4/2017 | Park | |
| 9,656,567 B2 | 5/2017 | Kothavale et al. | |
| 9,698,598 B2 | 7/2017 | Ballatine et al. | |
| 9,766,671 B2 | 9/2017 | Dorn et al. | |
| 9,908,421 B2 | 3/2018 | Koolen et al. | |
| 10,150,380 B2 | 12/2018 | Vaughan et al. | |
| 10,252,633 B2 | 4/2019 | Baxter et al. | |
| 10,744,883 B2 | 8/2020 | Quattrini et al. | |
| 11,007,885 B2 | 5/2021 | Koolen et al. | |
| 11,171,509 B2 | 11/2021 | Lee et al. | |
| 11,433,772 B2 | 9/2022 | Vaughan et al. | |
| 2003/0052547 A1 | 3/2003 | Fischer et al. | |
| 2004/0042138 A1 | 3/2004 | Saito et al. | |
| 2004/0130292 A1 | 7/2004 | Buchanan et al. | |
| 2005/0099131 A1 | 5/2005 | Amarillas et al. | |
| 2006/0108971 A1 | 5/2006 | Ono | |
| 2008/0082180 A1 * | 4/2008 | Blevins ................... | H04L 43/16 |
| | | | 700/29 |
| 2009/0021213 A1 | 1/2009 | Johnson | |
| 2009/0040029 A1 * | 2/2009 | Bridges ................... | G06Q 50/06 |
| | | | 340/12.37 |
| 2009/0045676 A1 | 2/2009 | Rosendahl | |
| 2009/0066287 A1 * | 3/2009 | Pollack ................... | G06Q 50/00 |
| | | | 320/101 |
| 2009/0261779 A1 | 10/2009 | Zyren | |
| 2009/0282274 A1 | 11/2009 | Langgood et al. | |
| 2009/0313098 A1 | 12/2009 | Hafner et al. | |
| 2010/0017249 A1 | 1/2010 | Fincham et al. | |
| 2010/0026237 A1 | 2/2010 | Ichikawa et al. | |
| 2010/0039062 A1 | 2/2010 | Gu et al. | |
| 2010/0066170 A1 | 3/2010 | Schuler | |
| 2010/0106631 A1 | 4/2010 | Kurayama et al. | |
| 2010/0134067 A1 | 6/2010 | Baxter et al. | |
| 2010/0141204 A1 | 6/2010 | Tyler et al. | |
| 2010/0181957 A1 | 7/2010 | Goeltner | |
| 2010/0198440 A1 | 8/2010 | Fujitake | |
| 2011/0050164 A1 | 3/2011 | Partovi et al. | |
| 2011/0066515 A1 | 3/2011 | Horvath et al. | |
| 2011/0140657 A1 | 6/2011 | Genzel et al. | |
| 2011/0175569 A1 | 7/2011 | Austin | |
| 2011/0184579 A1 | 7/2011 | Nilsen et al. | |
| 2011/0285345 A1 | 11/2011 | Kawai et al. | |
| 2011/0291616 A1 | 12/2011 | Kim et al. | |
| 2012/0200256 A1 | 8/2012 | Tse | |
| 2012/0326668 A1 | 12/2012 | Ballatine et al. | |
| 2012/0330494 A1 | 12/2012 | Hendrix et al. | |
| 2013/0049677 A1 | 2/2013 | Bouman | |
| 2013/0057209 A1 | 3/2013 | Nergaard et al. | |
| 2013/0057210 A1 | 3/2013 | Nergaard et al. | |
| 2013/0069592 A1 | 3/2013 | Bouman | |
| 2013/0181680 A1 | 7/2013 | Chau | |
| 2013/0257146 A1 | 10/2013 | Nojima et al. | |
| 2013/0310999 A1 | 11/2013 | Baxter et al. | |
| 2014/0028254 A1 | 1/2014 | Shane et al. | |
| 2014/0067183 A1 | 3/2014 | Sisk et al. | |
| 2014/0103866 A1 | 4/2014 | Kothavale et al. | |
| 2014/0320083 A1 | 10/2014 | Masuda et al. | |
| 2015/0123613 A1 | 5/2015 | Koolen et al. | |
| 2015/0123619 A1 | 5/2015 | Marathe et al. | |
| 2015/0165917 A1 | 6/2015 | Robers et al. | |
| 2015/0301547 A1 | 10/2015 | Johansson | |
| 2015/0326040 A1 | 11/2015 | Kawai et al. | |
| 2016/0114693 A1 | 4/2016 | Tsuno | |
| 2016/0126732 A1 | 5/2016 | Uyeki | |
| 2016/0375781 A1 | 12/2016 | Herke et al. | |
| 2017/0057369 A1 | 3/2017 | Næsje et al. | |
| 2017/0106764 A1 | 4/2017 | Beaston et al. | |
| 2017/0274792 A1 | 9/2017 | Vaughan et al. | |
| 2017/0353042 A1 | 12/2017 | Liu | |
| 2018/0001780 A1 | 1/2018 | Li et al. | |

(56) References Cited

U.S. PATENT DOCUMENTS

2018/0001781 A1   1/2018  Quattrini et al.
2019/0375308 A1  12/2019  Vaughan et al.

FOREIGN PATENT DOCUMENTS

| | | | |
|---|---|---|---|
| CN | 104810894 A | 7/2015 | |
| EP | 2110923 A1 | 10/2009 | |
| EP | 2388884 A2 | 11/2011 | |
| EP | 2871090 A1 | 5/2015 | |
| EP | 3560749 A1 | 10/2019 | |
| JP | H05197892 A * | 8/1993 | ............ G08C 19/00 |
| JP | 2006-020438 A | 1/2006 | |
| JP | 2011-239559 A | 11/2011 | |
| JP | 2015073431 A | 4/2015 | |
| KR | 10-2010-0036896 A | 4/2010 | |
| KR | 20110048444 A | 5/2011 | |
| WO | 2008142431 A1 | 11/2008 | |
| WO | 2009034918 A1 | 3/2009 | |
| WO | WO-2013144947 A2 * | 10/2013 | ......... B60L 11/1816 |
| WO | WO-2022157658 A2 * | 7/2022 | |

OTHER PUBLICATIONS

Advisory Action from U.S. Appl. No. 12/641,285, dated Mar. 30, 2015, 2 pages.
Chen J.Y., et al., "A Remote Control System for Home Appliances Using the Internet and Radio Connection," 2004 IEEE International Symposium on Computer Aided Control Systems Design, Taipei, Taiwan, Sep. 24, 2004, pp. 249-254.
Final Office Action from U.S. Appl. No. 12/508,488, dated Sep. 14, 2010, 10 pages.
Final Office Action from U.S. Appl. No. 12/641,285, dated Aug. 5, 2011, 11 pages.
Final Office Action from U.S. Appl. No. 12/641,285, dated Jul. 30, 2013, 16 pages.
Final Office Action from U.S. Appl. No. 12/641,285, dated May 18, 2016, 18 pages.
Final Office Action from U.S. Appl. No. 12/641,285, dated May 19, 2017, 14 pages.
Final Office Action from U.S. Appl. No. 12/641,285, dated Oct. 22, 2014, 17 pages.
International Search Report and Written Opinion for Application No. PCT/US2017/023682, dated Jun. 19, 2017, 12 pages.
International Search Report and Written Opinion for Application No. PCT/US2017/034575, dated Aug. 18, 2017, 15 pages.
Non-Final Office Action from U.S. Appl. No. 12/508,488, dated Jun. 23, 2010, 11 pages.
Non-Final Office Action from U.S. Appl. No. 12/641,285, dated Apr. 6, 2011, 14 pages.
Non-Final Office Action from U.S. Appl. No. 12/641,285, dated Dec. 17, 2012, 12 pages.
Non-Final Office Action from U.S. Appl. No. 12/641,285, dated Mar. 27, 2014, 21 pages.
Non-Final Office Action from U.S. Appl. No. 12/641,285, dated Oct. 7, 2015, 13 pages.
Non-Final Office Action from U.S. Appl. No. 12/641,285, dated Sep. 22, 2016, 13 pages.
Non-Final Office Action from U.S. Appl. No. 15/078,731, dated Nov. 20, 2017, 23 pages.
Non-Final Office Action from U.S. Appl. No. 15/295,824, dated Feb. 10, 2017, 11 pages.
Notice of Allowance from U.S. Appl. No. 12/508,488, dated May 12, 2011, 9 pages.
Notice of Allowance from U.S. Appl. No. 12/641,285, dated Sep. 29, 2017, 14 pages.
Notice of Allowance from U.S. Appl. No. 13/226,422, dated Mar. 29, 2013, 13 pages.
Notice of Allowance from U.S. Appl. No. 13/948,879, dated Aug. 28, 2015, 13 pages.
Notice of Allowance from U.S. Appl. No. 13/948,879, dated May 5, 2015, 17 pages.
Notice of Allowance from U.S. Appl. No. 14/298,842, dated Jul. 27, 2015, 12 pages.
Notice of Allowance from U.S. Appl. No. 14/298,842, dated Mar. 31, 2015, 16 pages.
Notice of Allowance from U.S. Appl. No. 14/956,264, dated Jan. 21, 2016, 18 pages.
Notice of Allowance from U.S. Appl. No. 14/956,264, dated Jun. 10, 2016, 13 pages.
Notice of Allowance from U.S. Appl. No. 15/295,824, dated Jul. 14, 2017, 9 pages.
Notice of Allowance from U.S. Appl. No. 15/295,824, dated Nov. 8, 2017, 19 pages.
Requirement for Restriction/Election from U.S. Appl. No. 12/508,488, dated Apr. 30, 2010, 9 pages.
European Search Report and Search Opinion, EP App. No. 17803633.1, dated Dec. 10, 2019, 11 pages.
Final Office Action from U.S. Appl. No. 15/078,731, dated Mar. 29, 2018, 25 pages.
Non-Final Office Action from U.S. Appl. No. 15/913,684, dated Jun. 18, 2018, 23 pages.
Notice of Allowance from U.S. Appl. No. 15/078,731, dated Aug. 1, 2018, 7 pages.
Notice of Allowance from U.S. Appl. No. 15/913,684, dated Nov. 29, 2018, 25 pages.
Notice of Allowance, U.S. Appl. No. 15/605,857, dated Dec. 26, 2019, 6 pages.
European Search Report and Search Opinion, EP App. No. 17771102.5, dated Jun. 15, 2020, 8 pages.
Non-Final Office Action, U.S. Appl. No. 16/379,361, dated Mar. 6, 2020, 9 pages.
Notice of Allowance, U.S. Appl. No. 15/605,857, dated Apr. 8, 2020, 6 pages.
Notice of Allowance, U.S. Appl. No. 15/605,857, dated Mar. 18, 2020, 2 pages.
Requirement for Restriction/Election, U.S. Appl. No. 16/215,411, dated May 18, 2020, 5 pages.
Communication pursuant to Article 94(3) EPC, EP App. No. 17803633.1, dated Nov. 13, 2020, 5 pages.
Final Office Action, U.S. Appl. No. 16/215,411, dated Nov. 25, 2020, 14 pages.
International Preliminary Report on Patentability, PCT App. No. PCT/US2017/023682, dated Oct. 4, 2018, 9 pages.
International Preliminary Report on Patentability, PCT App. No. PCT/US2017/034575, dated Dec. 6, 2018, 12 pages.
Non-Final Office Action, U.S. Appl. No. 16/215,411, dated Aug. 10, 2020, 14 pages.
Non-Final Office Action, U.S. Appl. No. 16/995,613, dated Nov. 27, 2020, 8 pages.
Notice of Allowance, U.S. Appl. No. 16/379,361, dated Oct. 6, 2020, 8 pages.
Advisory Action (PTOL-303) dated Feb. 1, 2021 for U.S. Appl. No. 16/215,411.
Final Office Action, U.S. Appl. No. 16/215,411, dated Jun. 11, 2021, 14 pages.
Final Office Action, U.S. Appl. No. 16/995,579, dated Mar. 4, 2021, 11 pages.
Final Office Action, U.S. Appl. No. 16/995,613, dated Mar. 9, 2021, 12 pages.
Non Final Office Action, U.S. Appl. No. 16/215,411, dated Feb. 19, 2021, 13 pages.
6 Notice of Allowance, U.S. Appl. No. 16/995,613, dated Jun. 17, 2021, 6 pages.
Final Office Action, U.S. Appl. No. 16/215,411, dated Jan. 14, 2022, 7 pages.
Non-Final Office Action U.S. Appl. No. 16/215,411, dated Sep. 30, 2021, 14 pages.
Non-Final Office Action, U.S. Appl. No. 16/995,579, dated Jul. 12, 2021, 5 pages.
Notice of Allowance, U.S. Appl. No. 16/995,579, dated Aug. 18, 2021, 5 pages.

(56) References Cited

OTHER PUBLICATIONS

Decision to grant a European patent, EP App. No. 17803633.1, dated Jun. 10, 2022, 2 pages.
Intention to grant, EP App. No. 17803633.1, dated Dec. 21, 2021, 5 pages.
Intention to grant, EP App. No. 17803633.1, dated Dec. 22, 2021, 1 pages.
Non-Final Office Action, U.S. Appl. No. 17/171,588, dated Oct. 6, 2022, 19 pages.
Non-Final Office Action, U.S. Appl. No. 17/493,696, dated Oct. 18, 2022, 7 pages.
Notice of Allowance, U.S. Appl. No. 16/215,411, dated Apr. 29, 2022, 7 pages.
Requirement for Restriction/Election, U.S. Appl. No. 17/493,684, dated Sep. 16, 2022, 5 pages.
Extended European Search Report and search Opinion for Application No. 22182902.1, dated Jan. 19, 2023, 10 pages.
Extended European Search Report and search Opinion for Application No. 22182905.4, dated Jan. 19, 2023, 12 pages.
Office Action, EP App. No. 17771102.5, dated Dec. 19, 2022, 5 pages.
Final Office Action, U.S. Appl. No. 17/493,684, dated Aug. 18, 2023, 22 pages.
Final Office Action, U.S. Appl. No. 17/493,696, dated Mar. 8, 2023, 9 pages.
Final Office Action, U.S. Appl. No. 17/903,822, dated Oct. 11, 2023, 14 pages.
Non-Final Office Action, U.S. Appl. No. 17/493,684, dated Apr. 10, 2023, 14 pages.
Non-Final Office Action, U.S. Appl. No. 17/903,822, dated Jun. 15, 2023, 19 pages.
Notice of Allowance, U.S. Appl. No. 17/171,588, dated Jun. 2, 2023, 9 pages.
Notice of Allowance, U.S. Appl. No. 17/493,696, dated Jul. 6, 2023, 5 pages.

* cited by examiner

METHOD AND APPARATUS FOR MANAGEMENT OF CURRENT LOAD TO AN ELECTRIC VEHICLE CHARGING STATION IN A RESIDENCE

CROSS-REFERENCE TO RELATED APPLICATIONS

This Application is a continuation of application Ser. No. 12/641,285, filed Dec. 17, 2009, which is hereby incorporated by reference.

BACKGROUND

Field

Embodiments of the invention relate to the field of energy management; and more specifically, to electric vehicle charging station electrical load management.

Background

Electric vehicles (e.g., electric battery powered vehicles, gasoline/electric battery powered hybrid vehicles, etc.) include electricity storage devices that must periodically be recharged. These electric vehicles are often charged at home (e.g., each night when the electric vehicle is finished being used). These electric vehicles can typically be charged using a standard home outlet (e.g., a 120 volt outlet). However, it may take several hours (e.g., eight or more hours) to completely charge an electric vehicle using a standard home outlet.

Electric vehicle charging stations (hereinafter "charging stations") can be used to charge the electric vehicles at a much faster pace than using a typical standard home outlet (e.g., within a few hours). These charging stations are typically hardwired directly to the power lines that supply electricity to the residence. While these charging stations charge electric vehicles faster than using a standard home outlet, they also cause a greater amount of electric current to be consumed while electric vehicles are charging compared with using a standard home outlet.

Residences have a limited electrical capacity (e.g., 60 Amps, 100 Amps, 200 Amps, etc) that is typically established by the ampacity of incoming service wire(s). For some residences, adding a charging station to the electrical load may cause the main breaker in the residence to trip when multiple electrical devices (e.g., washer, dryer, air conditioner, stove, oven, pool pump, hot water heater, electrical heater, hot tub heater, etc.) are being used at the same time. It is not convenient or economical to upgrade the size of the electrical service provided to a residence since this requires new and/or additional wiring, equipment, and typically requires a service call.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
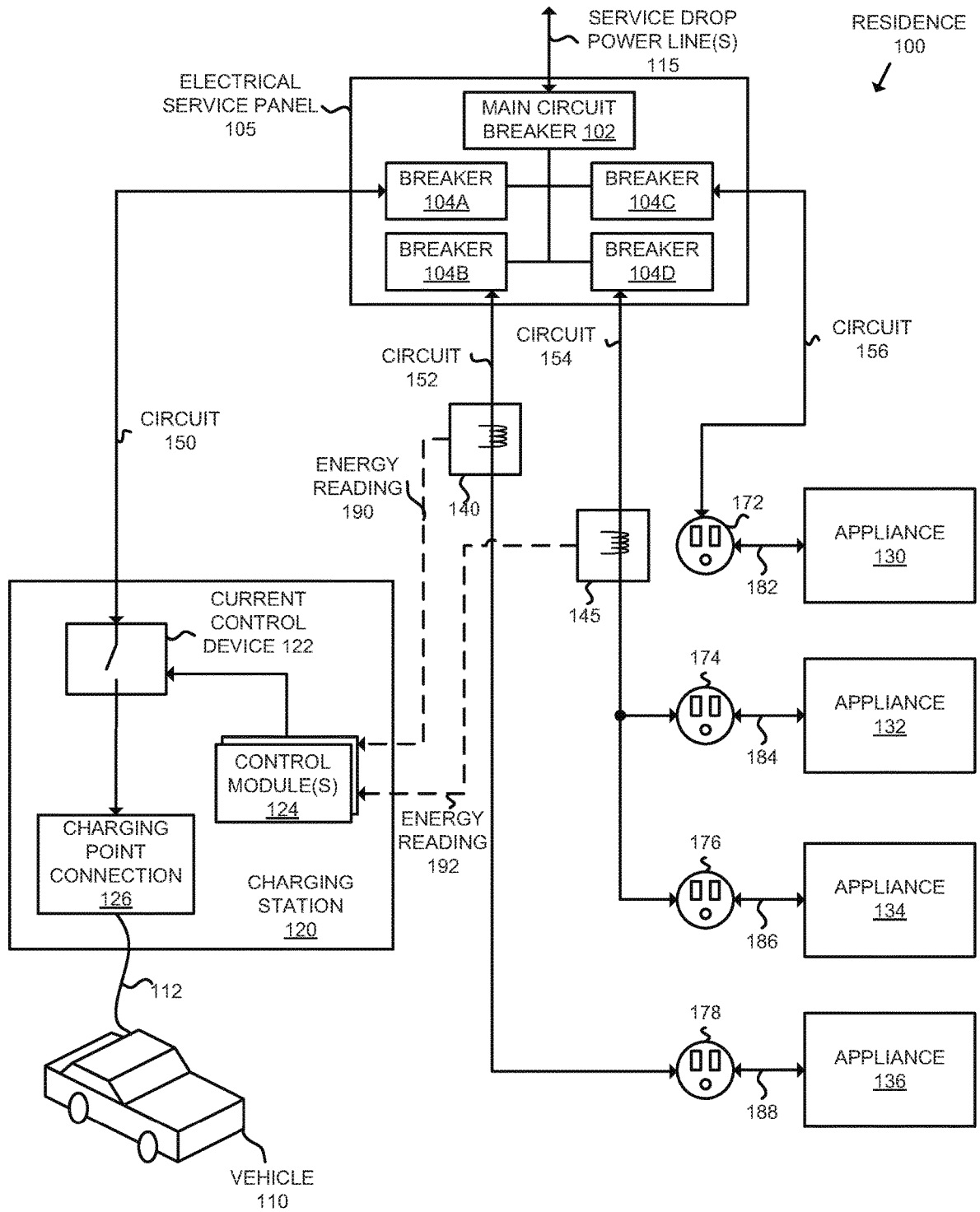
FIG. 1 illustrates an electric vehicle charging system with electrical load management according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The techniques shown in the figures can be implemented using code and data stored and executed on one or more electronic devices (e.g., a charging station). Such electronic devices can store and communicate (internally and/or with other electronic devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

A method and apparatus for an electrical vehicle charging system with electrical load management is described. In one embodiment of the invention, the electrical vehicle charging system includes a charging station that is installed in a residence that is used to charge electric vehicles and a number of current monitors that monitor current being drawn through electrical circuits of the residence. The charging station is coupled with a set of one or more service drop power lines through a main circuit breaker in an electrical service panel of the residence. The service drop power line(s) provide electricity from a power grid to the residence including the charging station. The charging station receives energy readings from the current monitors where each energy reading indicates that some amount of current is being drawn on the set of service drop power lines separate and apart from any current being drawn by an electric vehicle through the charging station. The charging station controls the amount of current that can be drawn by an electric vehicle through the charging station based on the received energy readings to avoid exceeding the electrical capacity of the residence and tripping the main circuit breaker.

FIG. 1 illustrates an electric vehicle charging system with electrical load management according to one embodiment of the invention. FIG. 1 illustrates the residence 100 (e.g., a house, apartment, condo, townhouse, etc.), which is provided electricity through the service drop power line(s) 115. The service drop power line(s) 115 are coupled to the main circuit breaker 102 in the electrical service panel 105. The service drop power line(s) 115 provide the electricity from a local power grid, which is not illustrated in order not to confuse understanding of the invention. The ampacity of the service drop power line(s) 115 define the electrical capacity for the residence 100. It should be understood that the specific value of the electrical capacity for the residence 100 is not germane to the understanding of the invention.

The main circuit breaker 102 is typically rated for an amount substantially equivalent to the electrical capacity of the residence 100, however in some embodiments it is rated for an amount lower than the electrical capacity of the residence 100. The electrical service panel 105 also includes the circuit breakers 104A-104D, which are each coupled with the main circuit breaker 102 (e.g., through one or more bus bars in the panel 105). It should be understood that no electricity is provided to electrical devices in the residence 100 if the main circuit breaker 102 is in the off position or has tripped.

The residence 100 includes the appliances 130, 132, 134, and 136. It should be understood that the number of appliances is exemplary and is not limiting on embodiments of the invention described herein. The appliances 130, 132, 134, and 136 are electrical devices (e.g., washer, dryer, air conditioner, stove, oven, pool pump, hot water heater, electrical heater, hot tub heater, etc.) that draw electric current from the service drop power line(s) 115. The appliance 130 is plugged into the electrical receptacle 172 via the cord 182, the appliance 132 is plugged into the electrical receptacle 174 via the cord 184, the appliance 134 is plugged into the electrical receptacle 176 via the cord 186, and the appliance 136 is plugged into the electrical receptacle 178 via the cord 188. The electrical receptacle 172 is coupled with the circuit breaker 104C by the electrical circuit 156. The electrical receptacles 174 and 176 are each coupled with the circuit breaker 104D by the electrical circuit 154 (thus the appliances 132 and 134 are on the same circuit). The electrical receptacle 178 is coupled with the circuit breaker 104B by the electrical circuit 152.

The residence 100 also includes the charging station 120, which is used to charge electric vehicles (e.g., the electric vehicle 110). In some embodiments, the charging station 120 is capable of charging electric vehicles at a faster rate than charging electric vehicles through a standard outlet. According to one embodiment of the invention, the charging station 120 is rated with a maximum amount of current for charging electric vehicles and it does not typically exceed that amount (e.g., 40 Amps, 80 Amps, etc.).

As illustrated in FIG. 1, the charging station 120 is wired to the breaker 104A through the electrical circuit 150. However, it should be understood that in some embodiments of the invention the charging station 120 is plugged into an electrical receptacle which is wired to the breaker 104A. While FIG. 1 illustrates the charging station 120 being the only device wired on the breaker 104A, it should be understood that in some embodiments other devices (e.g., other appliances) may also be wired to the breaker 104A.

As illustrated in FIG. 1, the charging station 120 includes a set of one or more control modules 124 coupled with the current control device 122, and the charging point connection 126. The charging point connection 126 provides an attachment for electric vehicles to a source of electric current and allows electric vehicles to be charged (assuming that the charging point connection 126 is energized, which will be described in greater detail later herein). In some embodiments the charging point connection 126 is a power receptacle that receives plugs from electric vehicle charging cords, while in other embodiments the charging point connection 126 includes circuitry for an attached charging cord (a cord that is fixably attached to the charging station 120). As illustrated in FIG. 1, the electric vehicle 110 is attached to the charging point connection 126 by the charging cord 112.

The current control device 122, which is coupled with the charging point connection 126, controls the amount of current that can be drawn by an electric vehicle (e.g., the electric vehicle 110) through the charging point connection 126. Thus the charging point connection 126 controls the amount of electric current that can be drawn from the service drop power line(s) 115 by the electric vehicle 110 through the charging point connection 126. In some embodiments, the current control device 122 is a solid state device or any other device suitable for controlling the flow of electricity that switches the charging point connection 126 on or off by energizing or de-energizing the charging point connection 126. It should be understood that current does not flow through the charging point connection 126 when it is de-energized. In other embodiments the current control device 122 variably controls the amount of current that can be drawn through the charging point connection 126 (e.g., through Pulse Width Modulation (PWM) circuitry). In some embodiments the current control device 122 is controlled by instructions from the control modules 124.

Also illustrated in FIG. 1 are the current monitors 140 and 145. The current monitors 140 and 145 measure current flowing on the electrical circuits 152 and 154 respectively. Thus, the current monitors 140 and 146 measure the amount of current that is being drawn on the service drop power line(s) 115 through the electrical circuits 152 and 154 respectively. In some embodiments the current monitors 140 and 145 are inductive couplers (or other current transformers) that are attached to the circuits 152 and 154 (e.g., clamped on the circuits 152 and 154), however in other embodiments the current monitors 140 and 145 may be other devices that are suitable for monitoring current on an electrical circuit. In some embodiments, the current monitors 140 and 145 are located within the electrical service panel 105, while in other embodiments the current monitors 140 and 145 are located outside of the electrical service panel 105. While the current monitors 140 and 145 may be located on any circuit in the residence 100, typically they are installed on circuits coupled to appliances that consume a relatively large amount of current (e.g., stove, washer, dryer, water heater, sauna/hot tub, air conditioning system, heater, etc.).

As illustrated in FIG. 1, the current monitors 140 and 145 transmit the energy readings 190 and 192 respectively to the charging station 120. An energy reading that is received by the charging station 120 indicates to the charging station 120 that an amount of current is being drawn on the service drop power line(s) 115 separate and apart from any current that is being drawn through the charging point connection 126. For example, the energy reading 192 serves as an indication that an amount of current is being drawn on the electrical circuit 154 (e.g., one or both of the appliances 132 and 134 is drawing current). In some embodiments, each energy reading includes a specific amount of current draw as monitored by the corresponding current monitor, while in other embodiments the energy reading indicates only that there is some amount of current draw that has been detected by the corresponding current monitor. In some embodiments, each energy reading includes a current monitor identifier that identifies the current monitor providing the energy reading.

In some embodiments, one or both of the current monitors 140 and 145 are adapted to transmit an energy reading responsive to detecting a threshold amount of current flowing on the electrical circuit 152 and 154 respectively (and thus do not transmit an energy reading until the current flow meets that threshold) while in other embodiments one or both of the current monitors 140 and 145 transmit an energy reading responsive to detecting any amount of current flowing on the electrical circuits 152 and 154 respectively. In some embodiments, the current monitors 140 and 145 are capable of updating and transmitting updated energy readings every few seconds (e.g., every second, etc.). In some embodiments the energy readings 190 and 192 are transmitted wirelessly (e.g., through ZigBee, Bluetooth, WiFi, Infrared, GPRS/GSM, CDMA, etc.) to the charging station 120, while in other embodiments the energy readings 190 and 192 are transmitted to the charging station 120 through a wired connection (e.g., Ethernet, PLC (Power Line Communication), etc.). While FIG. 1 illustrates the current monitors 140 and 145 transmitting energy readings to the charging station 120, in other embodiments the energy readings are provided to a separate transmitting device, which transmits the energy readings to the charging station 120.

The charging station 120 controls the amount of current that can be drawn by an electric vehicle (e.g., the electric vehicle 110) through the charging point connection 126 based on the received energy readings to avoid exceeding the electrical capacity of the residence and tripping the main circuit breaker. In some embodiments, the charging station 120 determines whether to de-energize (or energize) the charging point connection 126 based on the received energy readings 190 and/or 192. For example, in one embodiment, the charging station 120 de-energizes the charging point connection 126 responsive to determining that the amount of current as indicated by the received energy readings 190 and/or 192 exceeds a threshold (which may be configurable by the vehicle owner and/or administrative personnel). In another embodiment, the charging point connection 126 is de-energized while the charging station 120 receives the energy reading(s) 190 and/or 192, and is energized while the charging station 120 does not receive the energy reading(s) 190 and 192. For example, the charging station 120 monitors the arrival of the energy readings from the current monitors 140 and 145 (e.g., with the use of timers which will be described later herein or other processes) such that an absence of receiving an energy reading from a current monitor for a threshold amount of time is an indication that the current monitor is not presently measuring current flowing (or at least the threshold amount of current). For example, the absence of receiving an energy reading from the current monitor 140 is an indication that the current monitor 140 is not measuring current flow on the electrical circuit 152 (and thus that the appliance 136 is not presently drawing current from the electrical capacity of the residence 100).

Figure 6:
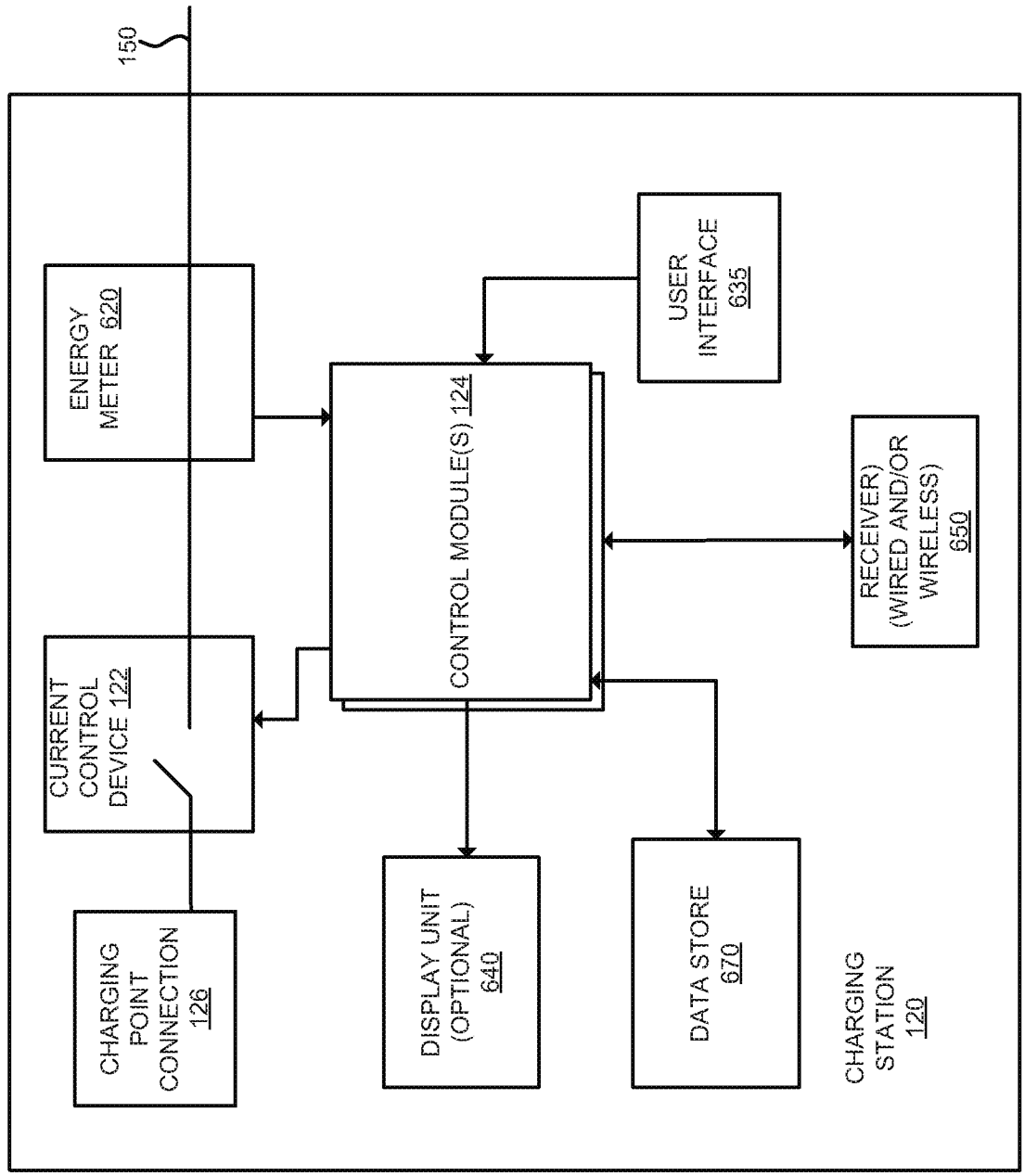
FIG. 6 is a block diagram that illustrates an exemplary charging station according to one embodiment of the invention.

FIG. 6 is a block diagram that illustrates a more detailed view of the charging station 120 according to one embodiment of the invention. As illustrated in FIG. 6, in addition to the charging point connection 126, the current control device 122, and the control module(s) 122, the charging station 120 also includes the receiver (wired and/or wireless) 650, the user interface 635 (which is optional), the data store 670, and the display unit 640 (which is optional).

The receiver 650 receives energy readings (e.g., the energy readings 190 and 192). The receiver 650 may be a wireless receiver (e.g., ZigBee, Bluetooth, WiFi, Infrared, GPRS/GSM, CDMA, etc.) or a wired receiver (e.g., Ethernet, PLC (Power Line Communication), etc.). It should be understood that the charging station 120 may include multiple receivers of different types. The received energy readings are provided to the control module(s) 124 for further processing (e.g., to determine whether the amount of current that can be drawn through the charging point connection 126 should be adjusted). In some embodiments, the charging station 120 also includes a transmitter (e.g., to send notification message(s) to the user(s) of the charging station 120).

The data store 670 stores data related to the charging station 120 including data related to charging sessions (e.g., for each session a session start time, session end time, amount of current drawn, etc) as well as data related to electrical load management (e.g., data in received energy readings, present potential current draw, etc.). In some embodiments, the data store 670 is adapted to store an electrical load management policy. The electrical load management policy defines the triggers and actions the charging station 120 takes when controlling the amount of current that can be drawn by an electric vehicle through the charging point connection 126 (e.g., whether to energize or de-energize the charging point connection 126, whether to adjust the maximum amount of electric current that can be drawn through the charging point connection 126 (and the amount of that adjustment), whether to inform the electric vehicle 110 that the maximum available current of the charging station 120 has changed, etc.). In some embodiments the electrical load management policy specifies a minimum amount of electric current that can be drawn by an electric vehicle through the electric vehicle charging station regardless of the received energy readings.

The display unit 640, which is optional, displays messages to the users of the charging station 120. For example, the display unit 640 can display status messages including that charging has commenced, charging has completed, charging has been suspended, error message(s), etc.

The optional user interface 635 (e.g., a graphical user interface, a telnet interface, an interface accessible through a browser through a computing device (e.g., laptop, workstation, smart phone, etc.), etc.) allows users of the charging station 120 to configure the charging station 120 including electrical load management configurations. For example, the users may use the user interface 635 to configure the electrical load management policy.

The charging station 120 may also include an energy meter 620 (optional) which measures the amount of current flowing on the circuit 150 through the current control device 122 and the charging point connection 126. The readings from the energy meter 620 may be stored in the data store 670, and may be accessible by the user(s) of the charging station 120 (e.g., through the user interface 635).

Referring back to FIG. 1, the charging station 120 controls the amount of current that can be drawn by the electric vehicle 110 through the charging point connection 126 based on the energy readings 190 and/or 192. In one embodiment, the charging station 120 is adapted to prevent the electric vehicle 110 from drawing current upon receipt of either the energy reading 190 or the energy reading 192. By way of example, responsive to receiving the energy reading 190, which indicates that current is being drawn on the electrical circuit 152 (thus the appliance 136 is actively drawing current), the charging station 120 prevents the electric vehicle 110 from being charged through the charging point connection 126. For example, the control module(s) 124 cause the current control device 122 to de-energize the charging point connection 126 to prevent current from flowing through the charging point connection 126. It should be understood that de-energizing the charging point connection 126 effectively switches off the charging point connection 126 and current cannot flow through the charging point connection 126. As another example, charging station 120 may inform the electric vehicle 110 that charging is presently not allowed (e.g., it does not presently have current available) with the expectation that the electric vehicle 110 will cease drawing current. For example, if the SAE J1772 standard is used, the control module(s) 124 cause on-board charging circuitry (e.g., control pilot circuitry) coupled with the charging point connection 126 to modulate the pilot duty cycle to indicate that charging is not presently allowed.

It should be understood that the number of current monitors illustrated in FIG. 1 is exemplary and different number of current monitors may be used in embodiments described herein (e.g., a single current monitor, more than two current monitors, etc.). If there are more than two current monitors, in some embodiments the charging station 120 is adapted to prevent the electric vehicle 110 from drawing current through the charging point connection 126 upon receipt of a single energy reading from any of those current monitors.

In some embodiments, the charging station 120 re-energizes the de-energized charging point connection 126 after not receiving an energy reading from either the current monitor 140 or current monitor 145 for an amount of time (e.g., 5-10 seconds, or other time value that may be configurable by users of the charging station 120 and/or administrators (service personnel)). It should be understood that once re-energized, the charging station 120 can be used to charge the electric vehicle 110. Thus, by way of example, if the appliance 136 is presently drawing current (at least above the threshold level of the current monitor) (i.e., the appliance 136 is powered on and is operating), the current monitor 140 detects that current is being drawn and transmits the energy reading 190 to the charging station 120, which then reacts by de-energizing the charging point connection 126 to prevent the electric vehicle 110 from charging and drawing current through the charging point connection 126. Thus in this example, the charging station 120 does not allow charging while the appliance 136 is operating. Continuing the example, after the appliance 136 stops drawing current (at least below the threshold level of the current monitor) (e.g., the appliance 136 is not operating), the current monitor 140 will not detect current flowing on the electrical circuit 152 and will not transmit the energy reading 190 to the charging station 120, which will then react to the absence of the receiving of the energy reading from the current monitor 140 by energizing the charging point connection 126 to allow the electric vehicle to charge.

Figure 7:
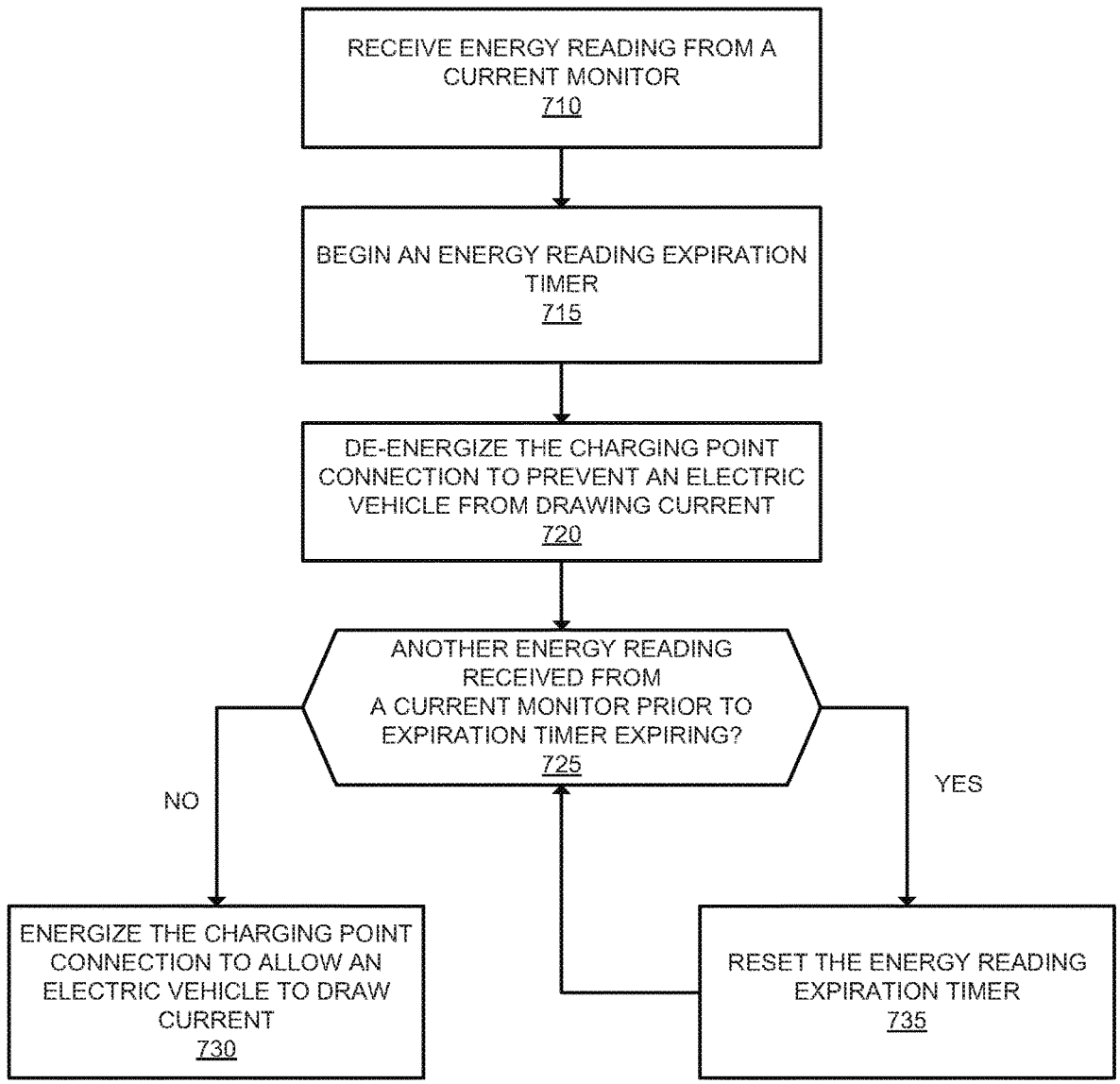
FIG. 7 is a flow diagram illustrating exemplary operations for electrical load management in an electrical vehicle charging system according to one embodiment of the invention.

FIG. 7 is a flow diagram illustrating exemplary operations for electrical load management performed by the charging station 120 according to one embodiment of the invention. The operations of FIG. 7 will be described with reference to the exemplary embodiments of FIG. 1. However, it should be understood that the operations of FIG. 7 can be performed by embodiments of the invention other than those discussed with reference to FIG. 1 (e.g., FIGS. 2, 3, and 5), and the embodiments discussed with reference to FIG. 1 can perform operations different than those discussed with reference to FIG. 7.

At block 710, the control module(s) 124 receive an energy reading from a current monitor. The energy reading may or may not indicate a specific amount of current that was monitored. For purpose of explanation, the control module(s) 124 have received the energy reading 190 from the current monitor 140. With reference to FIG. 6, the receiver 650 has received the energy reading 190 and has provided the energy reading 190 to the control module(s) 124. Flow moves from block 710 to block 715.

At block 715, the control module(s) 124 begin an energy reading expiration timer. As described above, in some embodiments the current monitors 140 and 145 periodically transmit (e.g., every second, every few seconds, etc.) energy readings responsive to detecting current flowing over a certain threshold. In these embodiments, a current monitor does not transmit an energy reading if it does not detect current flowing over the threshold. By way of example, the energy reading expiration timer is set for at least an amount of time in which the control module(s) 124 should receive another energy reading from a current monitor (e.g., if the current monitors transmit energy readings every second while current is being drawn, the energy reading expiration timer is set for greater than a second). Thus an expiration of an energy reading expiration timer serves as an indication that the corresponding current monitor is not presently detecting current (at least current above the threshold for that current monitor to transmit an energy reading). In some embodiments, the control module(s) 124 maintain a separate energy reading expiration timer for each current monitor installed in the residence 100 (e.g., a separate energy reading expiration timer for the current monitors 140 and 145). In some embodiments, the values of the energy reading expiration timer(s) are configurable by users of the charging station 120 via the user interface 635. Flow moves from block 715 to block 720.

At block 720, the control module(s) 124 cause the current control device 122 to de-energize the charging point connection 126 to prevent the electric vehicle 110 from drawing current through the charging point connection 126. It should be understood that de-energizing the charging point connection 126 may interrupt a charging session currently in progress or may prevent a charging session from being established since de-energizing the charging point connection 126 essentially turns off the electric supply at the charging point connection 126. An interrupted charging session can be referred to as a suspended charging session. Flow moves from block 720 to block 725.

In some embodiments, responsive to de-energizing the charging point connection 126, the charging station 120 transmits a charging station de-energized notification message to the user(s) of the charging station 120. The charging station de-energized notification message may be a text message, an email, or other message type, which alerts the user(s) that the charging station is de-energized. In one embodiment, the charging station 120 transmits the charging station de-energized notification message only if de-energizing the charging point connection 126 interrupts a charging session currently in progress.

At block 725, the control module(s) 124 determine whether another energy reading has been received from a current monitor prior to the energy reading expiration timer expiring. If an energy reading has been received, then flow moves to block 735 where the control module(s) 124 reset the energy reading expiration timer. Flow moves from block 735 back to block 725. It should be understood that as long the control module(s) 124 receive energy readings prior to the energy reading expiration timer expiring, the charging point connection 126 remains de-energized (with the exception of receiving an override command from a user of the charging station 120). If an energy reading has not been received prior to the expiration timer expiring, then flow moves to block 730.

At block 730, the control module(s) 124 cause the current control device 122 to energize the charging point connection 126 to allow the electric vehicle 110 to draw current through the charging point connection 126. Energizing the charging point connection 126 essentially turns on the electric supply at the charging point connection 126. In some embodiments, responsive to energizing the charging point connection 126, the charging station 120 transmits a charging station energized notification message to the user(s) of the charging station 120. The charging station energized notification message may be a text message, an email, or other message type which alerts the user(s) that the charging station is now energized. In one embodiment, the charging station 120 transmits the charging station energized notification message only if there is currently a suspended charging session.

In some embodiments, instead of de-energizing the charging point connection 126 as described above with reference to block 720, if there is a charging session in progress (e.g., the electric vehicle 110 is presently drawing current through the charging station 120), the charging station 120 informs the electric vehicle 110 that charging is not presently allowed (e.g., it does not presently have current available) and the electric vehicle 110 ceases drawing current. This essentially suspends the charging session. For example, if the SAE J1772 standard is used, on-board charging circuitry (e.g., control pilot circuitry) of the charging station 120 modulates the pilot duty cycle to indicate that charging is presently not allowed and the electric vehicle 110 ceases charging. If the electric vehicle 110 does not cease drawing current, the operations in block 720 are performed. If a charging session is requested while the energy reading expiration timer has not expired, the charging station 120 will respond by indicating that charging is not presently allowed. In some embodiments, the charging station 120 transmits a notification message (e.g., text message, email, or other message type) to the user(s) of the charging station 120 that the charging session has been suspended.

In some embodiments, instead of energizing the charging point connection 126 as described above with reference to block 730, if there is a suspended charging session, the charging station 120 informs the electric vehicle 110 that charging is allowed and the electric vehicle 110 may then begin drawing current. This essentially resumes the suspended charging session. For example, if the SAE J1772 standard is used, on-board charging circuitry (e.g., control pilot circuitry) of the charging station 120 modulates the pilot duty cycle to indicate that charging is allowed at its maximum current capacity and the electric vehicle 110 acts accordingly and begins drawing current. In some embodiments, the charging station 120 transmits a notification message (e.g., text message, email, or other message type) to the user(s) of the charging station 120 when the charging session has resumed.

While in one embodiment the charging station 120 is adapted to prevent the electric vehicle from drawing current upon receipt of either the energy reading 190 or the energy reading 192, in another embodiment the charging station 120 is adapted to prevent the electric vehicle 110 from drawing current through the charging point connection 126 upon receipt of both of the energy readings 190 and 192 in the same time period. Thus in this embodiment, the charging station 120 prevents electric vehicles from being charged while it receives both of the energy readings 190 and 192 in the same time period. With reference to FIG. 7, the control module(s) 124 maintain a separate energy reading expiration timer for the current monitors 140 and 145.

It should be understood that the number of current monitors illustrated in FIG. 1 is exemplary and different number of current monitors may be used in embodiments described herein (e.g., a single current monitor, more than two current monitors, etc.). If there are more than two current monitors, in some embodiments the charging station 120 is adapted to prevent the electric vehicle 110 from drawing current through the charging point connection 126 upon receipt of energy readings from any combination of two or more current monitors within the same time period (e.g., within 5 seconds, etc.). In some embodiments the number of energy readings received from different current monitors and/or the combination of current monitors that trigger the de-energizing of the charging point connection 126 are configurable by users of the charging station 120 (e.g., in the electrical load management policy).

Figure 8:
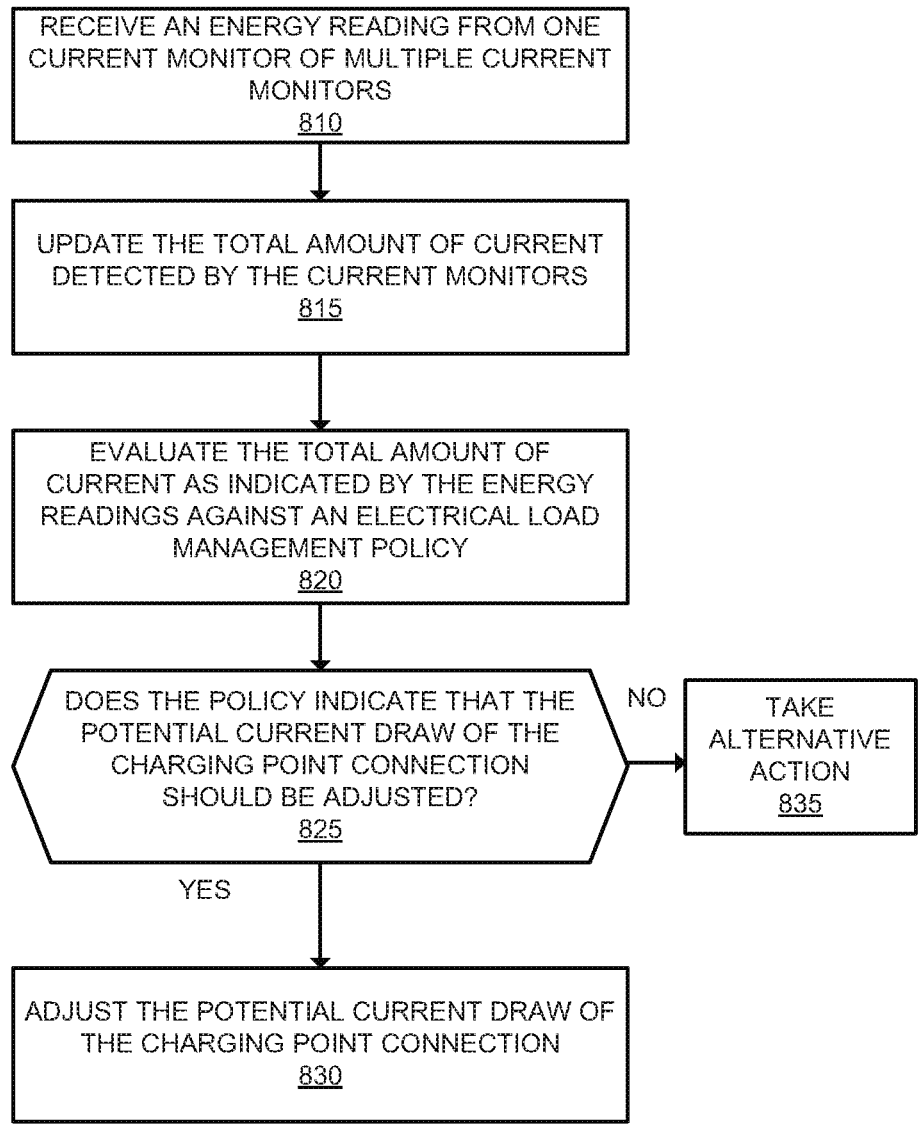
FIG. 8 is a flow diagram illustrating exemplary operations for an alternative electrical load management process according to one embodiment of the invention.

FIG. 8 is a flow diagram illustrating exemplary operations for an alternative electrical load management process performed by the charging station 120 according to one embodiment of the invention. The operations of FIG. 8 will be described with reference to the exemplary embodiments of FIG. 1. However, it should be understood that the operations of FIG. 8 can be performed by embodiments of the invention other than those discussed with reference to FIG. 1 (e.g., FIGS. 2, 3, and 5), and the embodiments discussed with reference to FIG. 1 can perform operations different than those discussed with reference to FIG. 8. In contrast with FIG. 7, which described operations to energize or de-energize the charging point connection based one or more received energy readings regardless of any amount of current indicated in those energy reading(s), FIG. 8 describes operations that adjust the amount of current that can be drawn through the charging point connection based on the specific amount of current indicated in one or more received energy readings. It should be understood that the adjustment may include energizing/de-energizing the charging point connection or otherwise limiting the amount of current that can be drawn through the charging point connection.

At block 810, a determination is made whether the charging station 120 receives an energy reading from a current monitor. If the charging station 120 receives an energy reading, then flow moves to block 815, otherwise flow remains at block 810. By way of example and with reference to FIG. 1, the charging station 120 receives the energy reading 190 from the current monitor 140. In this embodiment, the current monitors 140 and 145 regularly transmit the energy readings 190 and 192 to the charging station 120. By way of example, the energy readings 190 and 192 are transmitted every few seconds and indicate the amount of the specific amount of current detected on the circuits 152 and 154 respectively. The energy readings may also include an identifier associated with the current monitor that transmitted the energy reading.

In addition, in this embodiment, the charging station 120 is configured to regularly expect energy readings 190 and 192 from the current monitors 140 and 145. The charging station 120 calculates the total amount of current as indicated by the energy readings 190 and/or 192 and updates that total amount as new energy readings are received. Thus the charging station 120 periodically updates the total amount of current observed by the current monitor(s) in the residence 100. According to one embodiment, after not receiving an energy reading from either of the current monitors 140 and 145 for an amount of time, the charging station 120 transmits a notification message to the to the user(s) of the charging station 120 that there may be a problem with one of the current monitors. Flow moves from block 810 to block 815, where the charging station 120 updates the total amount of current as indicated by the latest energy readings it has received from the current monitors 140 and 145. Flow moves from block 815 to block 820.

At block 820, the charging station 120 evaluates the total amount of current as indicated by the latest energy readings against an electrical load management policy. In one embodiment, the electrical load management policy includes an electric current threshold that defines when the charging point connection 126 should be de-energized or energized. For example, if the total amount of current as indicated by the latest energy readings is greater than the electric current threshold, then the charging point connection 126 should be de-energized (if not already de-energized). If the total amount of current as indicated by the latest energy readings is less than or equal to the electric current threshold, then the charging point connection 126 should be energized (if not already energized). It should be understood that de-energizing the charging point connection 126 effectively prevents any current from being drawn through that charging point connection and the potential current draw is zero. As used herein, the potential current draw is the maximum amount of current that can be drawn through the charging point connection 126 by an electric vehicle. In some embodiments the electric current threshold is configurable by user(s) of the charging station 120.

In another embodiment, the charging station 120 is adapted to dynamically adjust the potential current draw of the charging point connection 126 based on the received energy readings and the electrical load management policy. In this embodiment, the current control device 122 variably controls the amount of current that the electric vehicle 110 can draw through the charging point connection 126. It should be understood that the potential current draw may be less than the maximum amount of current that the charging station is rated for. The potential current draw may be adjusted (lowered or increased) based on the received energy reading(s). For example, the electrical load management policy is applied against the received energy reading(s) to determine whether to adjust the amount of current, and the amount of any adjustment, that can be drawn through the charging point connection 126.

As one example, the electrical load management policy can define the amount of adjustment to the potential current draw based on the total amount of current as indicated by the latest received energy readings. The amount of adjustment can be based on threshold levels. For example, if the total amount of current as indicated by the latest energy readings is less than a first adjustment threshold, the potential current draw is adjusted by a first amount (e.g., increased). As another example, if the total amount of current as indicated by the latest energy readings is greater than a second adjustment threshold, the potential current draw is adjusted by a second amount (e.g., decreased). In some embodiments the electrical load management policy specifies a minimum amount of electric current that can be drawn by the electric vehicle charging station regardless of the received energy readings (thus the policy specifies a minimum potential current draw).

It should be understood that the above examples are not exhaustive and the electrical load management policy can be applied in different ways. In addition, in some embodiments the electrical load management policy is configurable by user(s) of the charging station 120.

Flow moves from block 820 to block 825, where the control module(s) 124 determine whether the electrical load management policy indicates that the potential current draw of the charging point connection 126 should be adjusted. If the policy indicates that the potential current draw should be adjusted, then flow moves to block 830 where the potential current draw of the charging point connection 126 is adjusted. It should be understood that the potential current draw can be increased or decreased depending on the latest energy reading(s) and the electrical load management policy, and may include energizing or de-energizing the charging point connection 126. In some embodiments the electrical load management policy indicates the amount of the adjustment. Of course it should be understood that if the potential current draw is already at the maximum amount the charging station is rated for, the potential current draw cannot be adjusted higher than that amount. Of course the potential current draw is presently at zero, it cannot be adjusted lower than that amount.

In one embodiment, as part of adjusting the potential current draw of the charging point connection as described in block 830, the charging station 120 informs the electric vehicle 110 of its maximum amount of available current and the electric vehicle 110 adjusts its maximum current draw accordingly. For example, if the SAE J1772 standard is used, on-board charging circuitry (e.g., control pilot circuitry) of the charging station 120 communicates its maximum current capacity by modulating the pilot duty cycle and the electric vehicle 110 responds by adjusting its maximum current draw accordingly.

If the electrical load management policy indicates that the potential current draw should not be adjusted, then flow moves to block 835 where alternative action is taken (e.g., the process ends and the potential current draw remains the same). In some embodiments, the potential current draw does not drop below a minimum amount, which can be specified in the electrical load management policy.

In some embodiments, responsive to adjusting the potential current draw, the charging station 120 transmits a notification message (e.g., text message, email, or other message type) to the user(s) of the charging station 120 that the potential current draw has been adjusted. In one embodiment, the notification message is sent only if the potential current draw is decreased.

Flow moves from block 830 to block 810 where the charging station 120 waits to receive another energy reading. It should be understood that the potential current draw of the charging point connection may be adjusted as energy readings are received.

While FIG. 1 illustrates the current monitors being located between a circuit breaker and an electrical receptacle (e.g., the current monitor 140 located on the electrical circuit 152 positioned between the circuit breaker 140B and the electrical receptacle 178), and therefore monitoring electric current specific for an electrical circuit, it should be understood that the current monitors may be located in different locations.

Figure 2:
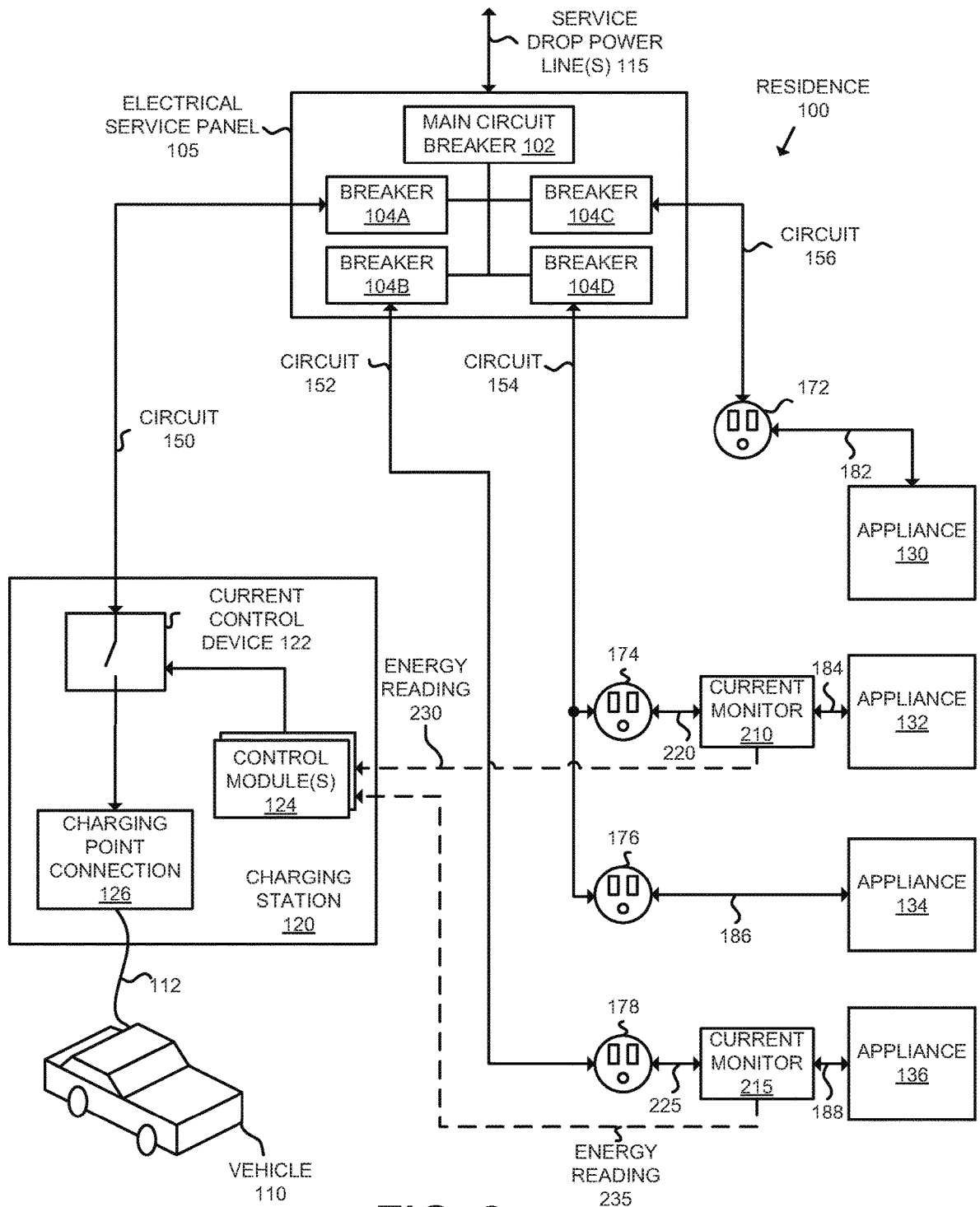
FIG. 2 illustrates an alternative electric vehicle charging system with electrical load management according to one embodiment of the invention.

FIG. 2 illustrates an alternative electric vehicle charging system with electrical load management according to one embodiment of the invention. FIG. 2 is similar to FIG. 1, with the exception that the current monitors are located in different positions in the residence 100. As illustrated in FIG. 2, the current monitor 210 is situated between the electrical receptacle 174 and the appliance 132, and the current monitor 215 is situated between the electrical receptacle 178 and the appliance 136. As illustrated in FIG. 2, the cords 184 and 188 are plugged into the current monitors 210 and 215 respectively. The current monitors 210 and 215 are plugged into the electrical receptacles 174 and 178 through the cords 220 and 225 respectively. However, it should be understood that in some embodiments the current monitors 210 and 215 are part of the cords 184 and 188, which then directly plug into the electrical receptacles 174 and 178 respectively. In other embodiments the current monitors 210 and 215 are clipped on the cords 184 and 188, which then directly plug into the electrical receptacles 174 and 178 respectively.

The current monitors 210 and 215 transmit energy readings similarly as described with reference to the current monitors 140 and 145 of FIG. 1. The current monitors 210 and 215 transmit the energy readings 230 and 235 to the charging station 120 respectively. In some embodiments the energy readings 230 and 235 are transmitted wirelessly (e.g., through ZigBee, Bluetooth, WiFi, Infrared, GPRS/GSM, CDMA, etc.) to the charging station 120, while in other embodiments the energy readings 230 and 235 are transmitted to the charging station 120 through a wired connection (e.g., Ethernet, PLC (Power Line Communication), etc.). The charging station 120 reacts to the energy readings 230 and 235 similarly as described with reference to FIG. 7 or FIG. 8.

While FIG. 2 illustrates the current monitors 210 and 215 transmitting the energy readings to the charging station 120, in other embodiments the energy readings are provided to a separate transmitting device, which transmits the energy readings to the charging station 120.

It should be understood that the positions of the current monitors illustrated in FIG. 2 allow for a more granular current monitoring and therefore a more granular electrical load management. For example, with reference to FIG. 1, the current monitors 140 and 145 monitor current draw per electrical circuit (the electrical circuits 152 and 154 respectively). This may include monitoring more than one electrical receptacle and more than one appliance. For example, the current monitor 145 monitors current draw on the electrical circuit 154, which is wired to the electrical receptacles 174 and 176. Since the appliances 132 and 134 are plugged into the electrical receptacles 174 and 176 respectively, the current monitor 145 is monitoring current draw for multiple appliances (the appliances 132 and 134). With reference to FIG. 2, the current monitors 210 and 215 each monitor current draw through a single electrical receptacle (174 and 178 respectively). Thus, the current monitor 210 monitors current draw for the appliance 132 and the current monitor 215 monitors current draw for the appliance 136. In addition, the current monitors 210 and 215 may be easily added by persons living at the residence 100 without requiring an electrical service call since the electrical service panel 105 does not need to be open in order to install the current monitors 210 and 215.

The charging station 120 controls the amount of current that can be drawn by the electric vehicle 110 through the charging point connection 126 based on one or more of the energy readings 230 and 235. For example, the charging station 120 may control the potential current draw in a similar way as described with reference to FIG. 7 or 8.

Figure 3:
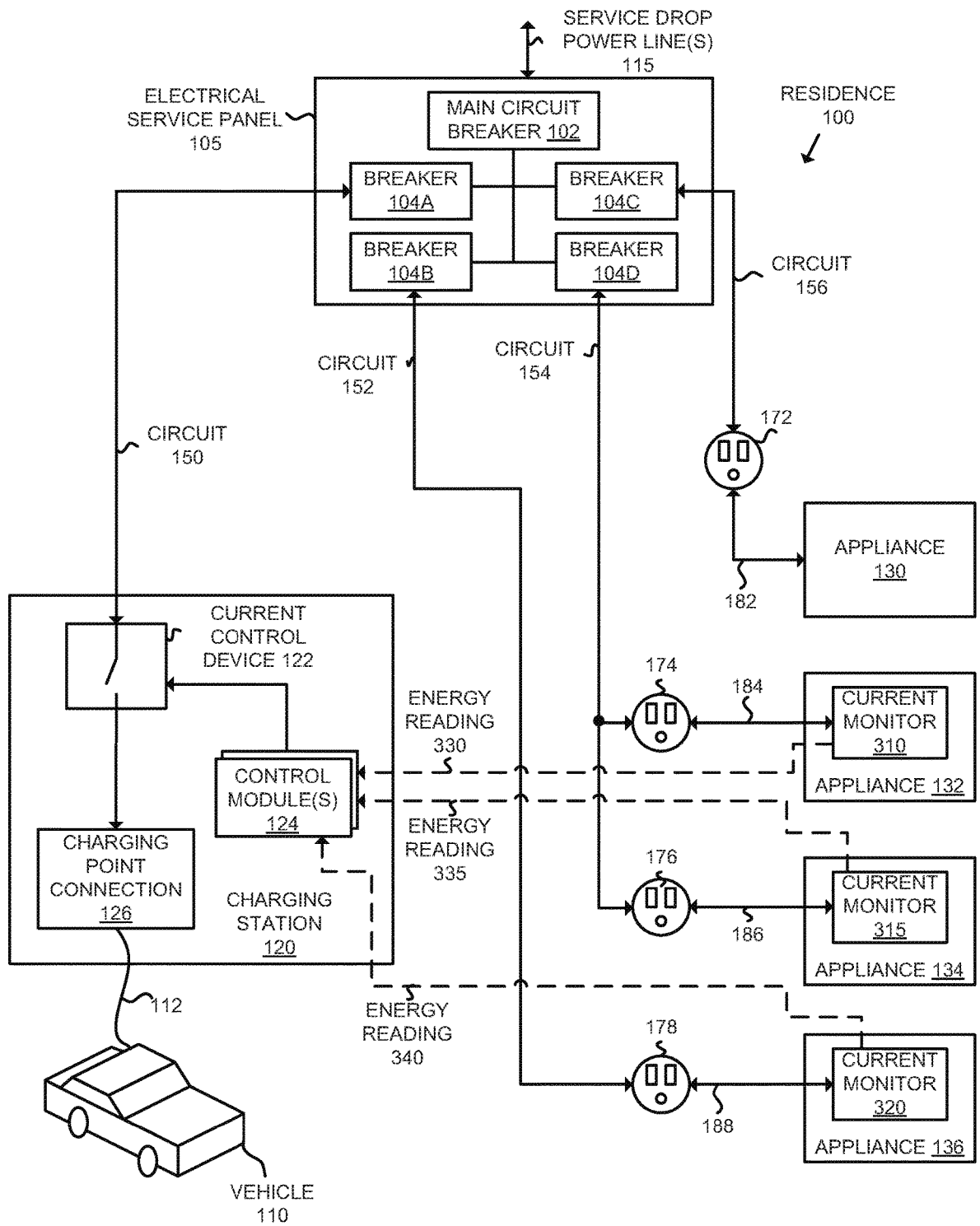
FIG. 3 illustrates an alternative electric vehicle charging system with electrical load management according to one embodiment of the invention.

FIG. 3 illustrates an alternative electric vehicle charging system with electrical load management according to one embodiment of the invention. FIG. 3 is similar to FIG. 1, with the exception that the current monitors are located in the appliances. As illustrated in FIG. 3, the appliances 132, 134, and 136 include the current monitors 310, 315, and 320. The current monitors 310, 315, and 320 transmit the energy readings 330, 335, and 340 respectively to the charging station 120 in a similar way as described with reference to the current monitors 140 and 145 of FIG. 1.

While FIG. 3 illustrates the current monitors 310, 315, and 320 transmitting the energy readings to the charging station 120, in other embodiments the energy readings are provided to a separate transmitting device, which transmits the energy readings to the charging station 120. In some embodiments the energy readings 330, 335, and 340 indicate the specific amount of current that is presently being drawn by the appliances 132, 134, and 136 respectively, while in other embodiments the energy readings 330, 335, and 340 indicate that only some amount of current is presently being drawn by the appliances 132, 134, and 136.

The charging station 120 controls the amount of current that can be drawn by the electric vehicle 110 through the charging point connection 126 based on one or more of the energy readings 330, 335, and 340. For example, the charging station 120 may control the potential current draw in a similar way as described with reference to FIG. 7 or 8.

Figure 4:
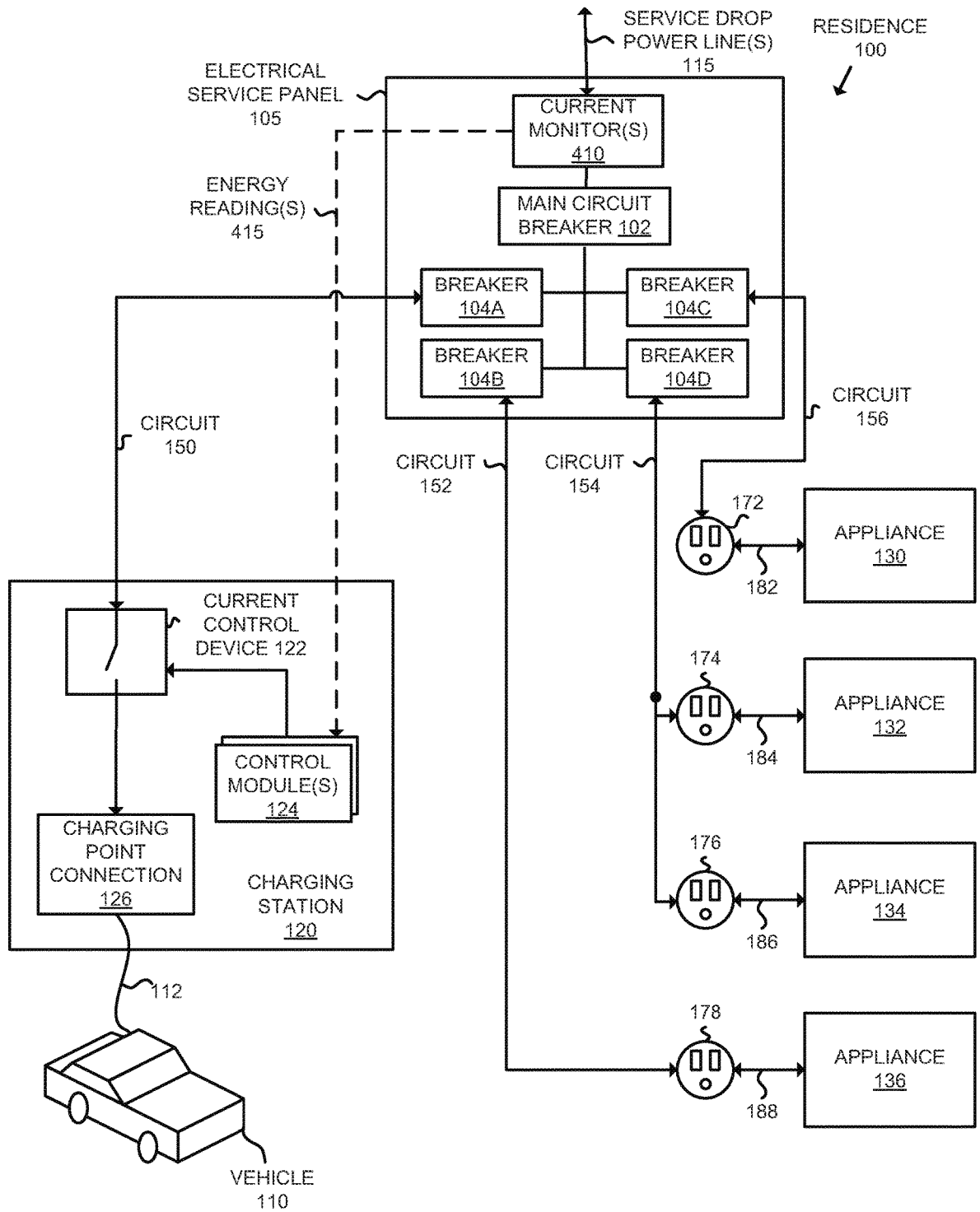
FIG. 4 illustrates an alternative electric vehicle charging system with electrical load management according to one embodiment of the invention.

FIG. 4 illustrates an alternative electric vehicle charging system with electrical load management according to one embodiment of the invention. As illustrated in FIG. 4, the current monitor(s) 410 are situated between the main circuit breaker 102 and the service drop power line(s) 115. The current monitor(s) 410 directly monitor the amount of current being drawn on the service drop power line(s) 115. Thus the current monitor(s) 410 monitor the electricity consumption of the entire residence 100 (e.g., the amount of current drawn on the electrical circuits 150, 152, 154, and 156). Although the current monitor(s) 410 are illustrated in FIG. 4 as being within the electrical service panel 105, it should be understood that the current monitor(s) 410 may be located outside of the electrical service panel 105. In one embodiment the current monitor 410(s) are inductive couplers that are attached to the service drop power line(s) 115 (e.g., there may be one current monitor per service drop power line) or any other device suitable for measuring current.

The current monitor(s) 410 transmit the energy reading(s) 415 to the charging station 120 in a similar way as described with reference to the current monitors 140 and 145 of FIG. 1. The energy reading(s) 415 are transmitted to the charging station 120 periodically. The energy reading(s) 415 include the specific amount of current that is presently being drawn on the service drop power line(s) 115. Unlike previous energy readings (e.g., energy readings 190 and 192 of FIG. 1), which did not include any current being drawn by the electric vehicle 110 through the charging station 120, the energy reading(s) 415 may include current being drawn by an electric vehicle 110 through the charging station 120. For example, the amount of current being drawn by the electric vehicle 110 will be included in the energy reading(s) 415.

The charging station 120 controls the amount of current that can be drawn by the electric vehicle 110 through the charging point connection 126 based on the energy readings(s) 415. For example, the charging station 120 determines what amount of current can be drawn through the charging point connection 126 by taking into account the electrical capacity of the residence (e.g., the size of the main circuit breaker 102) and the present amount of current being consumed in the residence 100 (as indicated by the energy reading(s) 415).

Figure 9:
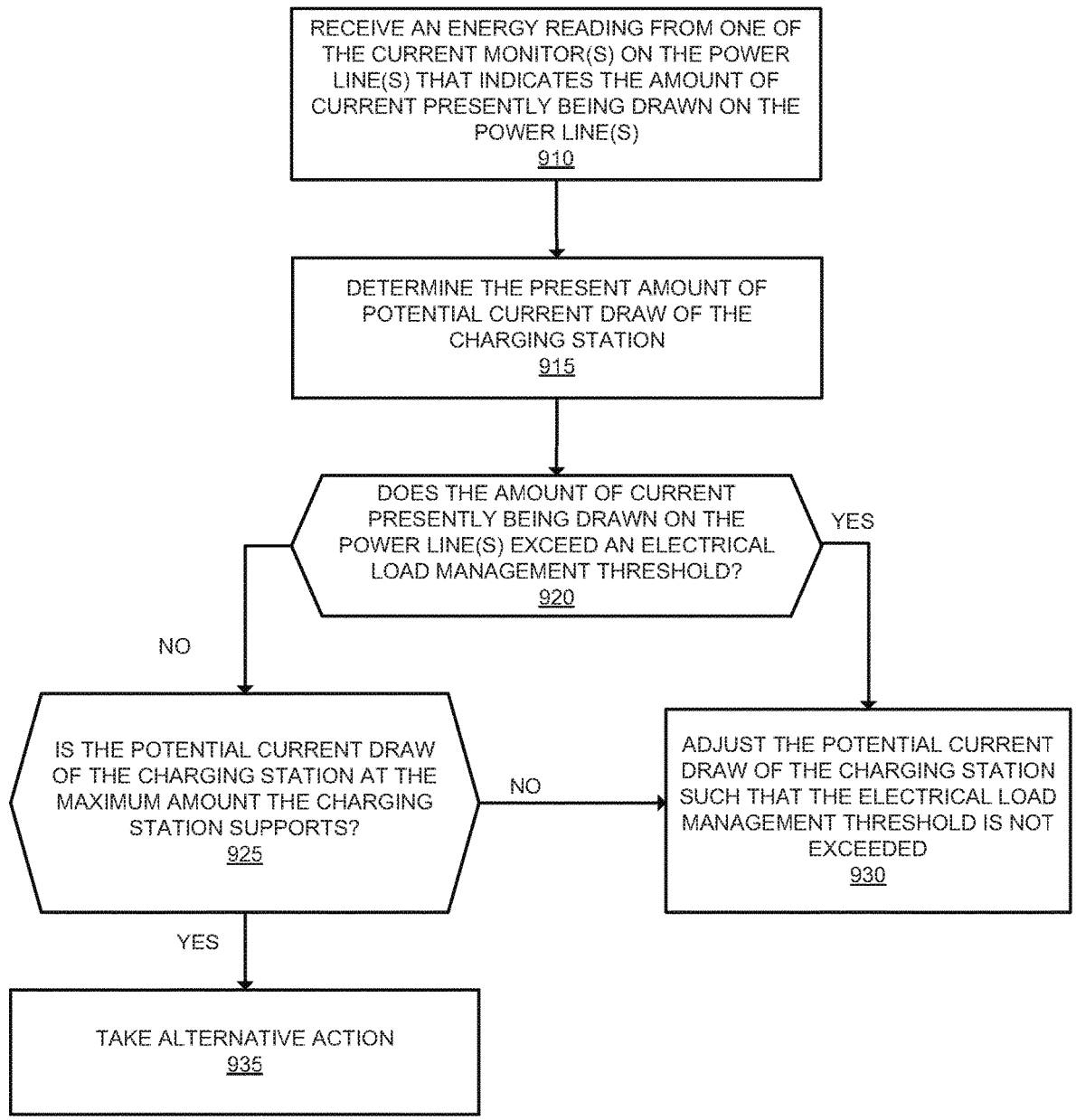
FIG. 9 is a flow diagram illustrating exemplary operations for an alternative electrical load management process according to one embodiment of the invention.

FIG. 9 is a flow diagram illustrating exemplary operations for an alternative electrical load management process according to one embodiment of the invention. The operations of FIG. 9 will be described with reference to the exemplary embodiments of FIG. 4. However, it should be understood that the operations of FIG. 9 can be performed by embodiments of the invention other than those discussed with reference to FIG. 4, and the embodiments discussed with reference to FIG. 4 can perform operations different than those discussed with reference to FIG. 9.

At block 910, the control module(s) 124 receive an energy reading from a current monitor on the service drop power line(s) that includes the amount of current that is presently being drawn on that service drop power line. With reference to FIG. 4, the control module(s) 124 receive the energy reading 415 from the current monitor(s) 410. Flow moves from block 910 to block 915.

At block 915, the control module(s) 124 determine the present amount of potential current draw of the charging station 120 (the maximum amount of electric current that can presently be drawn by an electric vehicle through the charging station 120). Flow moves from block 915 to block 920.

At block 920, the control module(s) 124 determine whether the amount of current presently being drawn on the service drop power line(s) 115 (as indicated by the received energy reading) exceeds an electrical load management threshold. The value of the electrical load management threshold is less than the electrical capacity of the residence 100 and typically less than the rating of the main circuit breaker 102. According to one embodiment, the electrical load management threshold is configurable by operators of the charging station 120. If the electrical load management threshold is exceeded, then flow moves to block 930, otherwise flow moves to block 925.

At block 930, the potential current draw of the charging station 120 is adjusted such that the electrical load management threshold is not exceeded (from block 920, the potential current draw of the charging station 120 is lowered). In one embodiment, the charging point connection 126 is de-energized such that the potential current draw of the charging station 120 is zero, while in other embodiments the potential current draw is lowered such that at least some amount of current may be drawn through the charging point connection 126 yet the threshold is not exceeded. In some embodiments, responsive to lowering the potential current draw, the charging station 120 transmits a notification message (e.g., text message, email, or other message type) to the user(s) of the charging station 120 that the potential current draw has been lowered. In some embodiments, the notification message is sent only if the potential current draw has been lowered under a certain threshold (e.g., if the potential current draw is at zero (the charging point connection 126 has been de-energized)).

In one embodiment, as part of adjusting the potential current draw of the charging point connection as described in block 930, the charging station 120 informs the electric vehicle 110 of its maximum amount of available current and the electric vehicle 110 adjusts its maximum current draw accordingly. For example, if the SAE J1772 standard is used, on-board charging circuitry (e.g., control pilot circuitry) of the charging station 120 communicates its maximum current capacity by modulating the pilot duty cycle and the electric vehicle 110 responds by adjusting its maximum current draw accordingly.

At block 925 (electrical load management threshold is not exceeded), the control module(s) 124 determine whether the potential current draw is at the maximum amount the charging station supports. As described above, the charging station 120 is rated to supply some maximum amount of current. If it is at the maximum amount, then flow moves to block 935 where alternative action is taken (e.g., the process ends without the potential current draw being adjusted), otherwise flow moves to block 930 where the potential current draw of the charging station 120 is adjusted such that the electrical load management threshold is not exceeded (from block 925, the potential current draw of the charging station 120 is increased). In one embodiment, the charging point connection 126 is energized (e.g., if the charging point connection 126 is currently de-energized) while in other embodiments the control module(s) 124 cause the potential current draw of the charging station 120 to be increased by an amount that will not cause the electrical load management threshold to be exceeded (based on the latest energy reading). In some embodiments, responsive to increasing the potential current draw, the charging station 120 transmits a notification message (e.g., text message, email, or other message type) to the user(s) of the charging station 120 that the potential current draw has been increased. In some embodiments, the notification message is sent only if the potential current draw has been increased over a certain threshold (e.g., if the charging point connection 126 was de-energized and is now energized).

Figure 5:
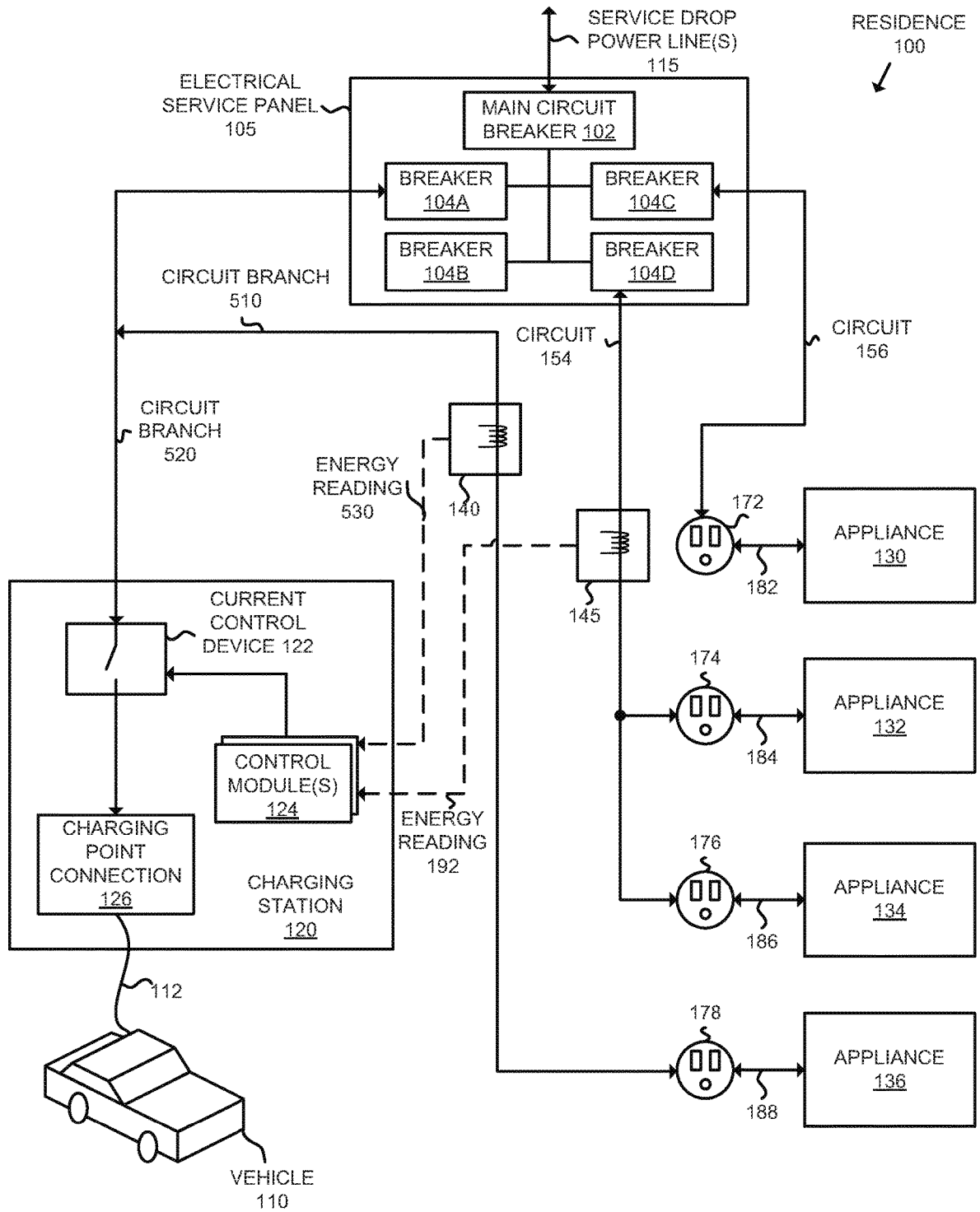
FIG. 5 illustrates an alternative electric vehicle charging system with electrical load management according to one embodiment of the invention.

While FIG. 1 illustrates the charging station 120 being on a separate circuit from other circuits that include a current monitor, embodiments of the invention are not so limited. FIG. 5 illustrates an alternative electric vehicle charging system with electrical load management according to one embodiment of the invention. FIG. 5 is similar to FIG. 1, with the exception that the receptacle 178 is wired to the circuit breaker 104A along with the charging station 120. Thus the charging station 120 and the electrical receptacle 178 share the circuit breaker 104A. The current monitor 140 measures current drawn by the appliance 136 through the electrical receptacle 178. It should be understood that the current monitor 140 does not measure current being drawn by the charging station 120. Thus, as illustrated in FIG. 5, the energy reading 530 indicates to the charging station 120 that an amount of current is being drawn on the circuit branch 510 through the electrical receptacle 178.

According to one embodiment, the charging station 120 controls the amount of current that can be drawn by the electric vehicle 110 through the charging point connection 126 based on one or more of the energy readings 530 and 192 in a similar way as described with reference to FIG. 7 or 8.

Thus with use of the electrical load management embodiments described herein, a charging station can be used at a residence to provide convenient and fast charging without exceeding the electrical capacity of the residence and typically without upgrading the size of the electrical service provided to that residence.

While embodiments of the invention have described the charging station 120 reacting to energy readings that correspond to energy consumption from different appliances, in some embodiments the charging station 120 controls the energy consumption of appliances through one or more messages. For example, in some embodiments the user(s) of the charging station 120 can request charging sessions with a high priority. These high priority charging sessions may take precedence over the electrical usage of some of the other appliances. For example, with reference to FIG. 3, if the appliance 132 also includes a current control device (which may be similar to the current control device 122 of the charging station 120), responsive to receiving a high priority charging session request, the charging station 120 may transmit a message that instructs the appliance 132 to cease or throttle its potential current draw. Sometime after the high priority charging session has completed (e.g., charging has completed, a user has stopped the session, etc.), the charging station 120 can send a message that instructs the appliance 132 to resume or increase its potential current draw back to its normal potential current draw.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in an electric vehicle charging station to assist in regulating electrical load management in a residence, wherein the electric vehicle charging station is coupled through a main circuit breaker in an electrical service panel of the residence with a set of one or more service drop power lines that provide electricity from a power grid to the electric vehicle charging station, the method comprising:
    receiving a set of one or more energy readings from a set of one or more current monitors attached to one or more electrical circuits of the residence that each measure current flowing on the one or more electrical circuits of the residence with the exclusion of the electrical circuit providing current to the electrical vehicle charging station, wherein the receiver receives an energy reading from a corresponding current monitor that only transmits the energy reading to the receiver responsive to the corresponding current monitor measuring an amount of current flowing through a corresponding electrical circuit over a first threshold amount, wherein the amounts from the one or more current monitors are separate and apart from any amount of current being drawn by an electric vehicle through the electric vehicle charging station coupling the electric vehicle with the set of service drop power lines;
    starting a timer upon receiving the set of energy readings, wherein the timer resets upon subsequent energy readings being received while the timer is not expired;
    limiting, based on the received set of energy readings from the one or more current monitors, the amount of current that can be drawn by an electric vehicle through the electric vehicle charging station such that the main circuit breaker does not exceed its rated amount; and
    responsive to the timer expiring, removing the limiting of the amount of current that can be drawn by the electric vehicle through the electric vehicle charging station.

2. The method of claim 1, wherein each energy reading also specifies the amount of current that the corresponding current monitor has monitored being drawn through one or more electrical circuits from the set of service drop power lines.

3. The method of claim 2, wherein the limiting includes lowering the amount of current that can be drawn by the electric vehicle when a latest one or more energy readings from each one or more current monitors indicate that the amount of current being drawn from the set of service drop power lines exceeds a second threshold.

4. The method of claim 2, wherein the limiting includes increasing the amount of current that can be drawn by the electric vehicle when a latest one or more energy readings from each one or more current monitors indicate that the amount of current being drawn from the set of service drop power lines is below a second threshold.

5. The method of claim 1, wherein the limiting includes de-energizing a charging point connection on the electric vehicle charging station that couples an electric vehicle with the set of service drop power lines such that no electric current can be drawn by the electric vehicle through the charging point connection.

6. The method of claim 1, wherein the set of current monitors includes one or more of the following: an inductive coupler positioned on an electrical circuit that is coupled with the electrical service panel, a device that plugs into an electrical receptacle and provides an electrical receptacle for appliances or other electrical consumption devices, a device included in appliances or other electrical consumption devices, and an inductive coupler positioned on the set of service drop power lines.

7. The method of claim 1, further comprising:
    monitoring arrival of the energy readings from the current monitors, wherein an absence of receiving an energy reading from a current monitor for a threshold amount of time is an indication of that current monitor not measuring an amount of current being drawn from the set of service drop power lines.

8. The method of claim 1, wherein the limiting includes dynamically adjusting the amount of current that can be drawn through a charging point connection on the electric vehicle charging station.

9. The method of claim 8, further comprising dynamically adjusting the amount of current that can be drawn by the electric vehicle charging station based on a configurable electrical load management policy and the set of energy readings, wherein the configurable electrical load management policy specifies a minimum amount of electric current that can be drawn by the electric vehicle charging station.

10. An electric vehicle charging station for charging electric vehicles to be installed in a residence, wherein the electric vehicle charging station is to be coupled through a main circuit breaker in an electrical service panel of the residence with a set of one or more service drop power lines that provide electricity from a power grid to the electric vehicle charging station, the electric vehicle charging station comprising:
a charging point connection to couple an electric vehicle with the set of service drop power lines through an electrical circuit;
a current control device coupled with the charging point connection to control an amount of electric current that can be drawn from the set of service drop power lines by an electric vehicle through the charging point connection;
a receiver to receive energy readings from one or more current monitors attached to one or more electrical circuits of the residence that measure current flowing on the one or more electrical circuits of the residence with the exclusion of the electrical circuit providing current to the electrical vehicle charging station, wherein the receiver receives an energy reading from a corresponding current monitor that only transmits the energy reading to the receiver responsive to the corresponding current monitor measuring an amount of current flowing through a corresponding electrical circuit over a first threshold amount, wherein the amounts from the one or more current monitors are separate and apart from an amount of current that is drawn through the charging point connection coupling the electric vehicle with the set of service drop power lines; and
a set of one or more control modules coupled with the receiver and the current control device, wherein the set of control modules are to cause the current control device to limit the amount of current that can be drawn by the electric vehicle through the charging point connection based on the received energy readings for a limited amount of time upon receipt of the energy readings to avoid tripping the main circuit breaker, and wherein the set of control modules are further to cause the current control device to not limit the amount of current that can be drawn by the electric vehicle through the charging point connection in response to absence of receipt of the energy readings for greater than the limited amount of time.

11. The electric vehicle charging station of claim 10, wherein each received energy reading further specifies the amount of current that is being drawn from the set of service drop power lines.

12. The electric vehicle charging station of claim 11, wherein the set of control modules are to cause the current control device to lower the amount of current that can be drawn by the electric vehicle through the charging point connection when latest received energy readings indicate that the amount of current being drawn from the set of service drop power lines exceeds a second threshold.

13. The electric vehicle charging station of claim 11, wherein the set of control modules are to cause the current control device to increase the amount of current that can be drawn by the electric vehicle through the charging point connection when latest received energy readings indicate that the amount of current being drawn from the set of service drop power lines is below a second threshold.

14. The electric vehicle charging station of claim 10, wherein the current control device is to energize or de-energize the charging point connection to control the amount of electric current that can be drawn by the electric vehicle charging station through the charging point connection, wherein no electric current can be provided to the electric vehicle when the charging point connection is de-energized.

15. The electric vehicle charging station of claim 10, wherein the set of control modules are to cause the current control device to de-energize the charging point connection or prevent the charging point connection from being energized for the limited amount of time upon receipt of the energy readings.

16. The electric vehicle charging station of claim 15, further comprising a timer for each of the current monitors to indicate an expiration of a corresponding energy reading, wherein an expiration of an energy timer is an indication that the corresponding current monitor is not presently detecting current.

17. The electric vehicle charging station of claim 16, wherein the set of control modules are to cause the current control device to energize the charging point connection or allow the charging point connection to be energized after expiration of each received energy reading.

18. The electric vehicle charging station of claim 10, wherein the set of control modules are to evaluate the received energy readings against an electrical load management policy to dynamically control the amount of electric current that can be drawn from the set of service drop power lines by the electric vehicle charging station.

19. The electric vehicle charging station of claim 18, wherein the electrical load management policy specifies a minimum amount of electric current that can be drawn by the electric vehicle charging station regardless of the received energy readings.

* * * * *